United States Patent [19]

Naito et al.

[11] Patent Number: 4,951,765
[45] Date of Patent: Aug. 28, 1990

[54] LOAD DETECTOR CIRCUIT

[75] Inventors: Kazufumi Naito, Ohtsu; Seiji Nishide, Shiga, both of Japan

[73] Assignee: Ishida Scales Mfg. Co., Ltd., Kyoto, Japan

[21] Appl. No.: 377,743

[22] Filed: Jul. 10, 1989

Related U.S. Application Data

[63] Continuation of Ser. No. 219,482, Jul. 15, 1988, abandoned.

[30] Foreign Application Priority Data

Jul. 16, 1987 [JP] Japan .................. 62-177745
Jul. 16, 1987 [JP] Japan .................. 62-177746

[51] Int. Cl.$^5$ .................. G01G 3/14; G01L 1/22
[52] U.S. Cl. .................. 177/211; 73/862.67
[58] Field of Search .................. 177/211; 73/862.65, 73/862.67

[56] References Cited

U.S. PATENT DOCUMENTS

Re. 32,631  3/1988  Layer .................. 177/211
4,241,801  12/1980  Kushmuk .................. 73/862.65 X Primary Examiner—George H. Miller, Jr.
Attorney, Agent, or Firm—Staas & Halsey

[57] ABSTRACT

Strain gages are attached to respective strain sensing areas of the strain generator of a load cell. Those strain gages which are mounted on expansive sides of the strain generator are connected in series with each other, and those strain gages which are mounted contactive sides of the strain generator are connected in series with each other, forming first and second series-connected circuits. The first and second series-connected circuits are connected in series with each other as a half bridge. A load applied to the strain generator is detected by an output signal produced from the junction between the first and second series-connected circuits. A temperature compensating resistor for compensating for a temperature-dependent change in the output signal due to a change in the temperature of the strain generator is connected in a circuit separate from the half bridge. Gain control is effected to eliminate a change in the output signal from the load detecting circuit based on a change in the resistance of the temperature compensating resistor.

6 Claims, 6 Drawing Sheets

LOAD DETECTOR CIRCUIT

This is a continuation of co-pending application Ser. No. 219,482 filed on July 15, 1988 now abandoned.

BACKGROUND OF THE INVENTION

1. Field of the Invention

The present invention relates to a load detector circuit having a low electric power requirement for use in a load-cell-type electronic weighing scale.

2. Description of the Prior Art

Weighing scales employing electronic circuits for weighing articles have been used in recent years. The weighing devices employing electronic circuits include a load cell comprising a strain gage with its electric resistance variable by a strain caused by the load of an article to be weighed. The strain gage is attached to a strain sensing area of a strain generator. An analog weight signal issued by the load cell is amplified, converted to a digital signal by an A/D converter, and then applied to a display unit for displaying information on the weight, etc.

FIG. 1 of the accompanying drawings shows a load detector of a two-beam-type load-cell electronic weighing scale having four strain gages C1, C2, T1, and T2 attached to a strain generator Y mounted on a support X, for detecting a weight W applied to a scale plate Z.

FIG. 2 shows an electric circuit of the load cell electronic weighing scale. The strain gages C1, C2, T1, and T2 attached to the strain generator Y at positions shown in FIG. 1 are electrically connected to form a full bridge circuit (Wheatstone bridge) having input terminals to which reference voltages $V_{ex}^+$, $V_{ex}^-$ are applied. When a load is applied to the strain generator and a strain is produced in the strain sensing area, the resistances of the strain gages C1, C2 and the resistances of the strain gages T1, T2 are varied in mutually opposite directions.

The full bridge circuit issued output voltages $V_o+$, $V_o-$ which are applied to inverting and noninverting input terminals of an operational amplifier. A voltage divider resistor RY is connected to the noninverting input terminal of the operational amplifier, whereas a feedback resistor Rf is connected to the inverting input terminal thereof.

The output voltage $(V_o+)-(V_o-)$ of the full bridge circuit is expressed as follows: It is assumed for simplicity that the resistances of the strain gages are selected to be $T=T2=C1=C2=R$.

(1) The resistances when the load W is applied to the scale plate Z at a position A are given by:

$$T1 = T2 = R + \Delta R \tag{1}$$

$$C1 = C2 = R - \Delta R \tag{2}$$

(2) The resistances when the load W is applied to the scale plate Z at a position B are given by:

$$T1 = R + \Delta R - \Delta Rm \tag{3}$$

$$T2 = R + \Delta R + \Delta Rm \tag{4}$$

$$C1 = R - \Delta R - \Delta Rm \tag{5}$$

$$C2 = R - \Delta R + \Delta Rm \tag{6}$$

(3) The resistances when the load W is applied to the scale plate Z at a position C are given by:

$$T1 = R + \Delta R + \Delta Rm \tag{7}$$

$$T2 = R + \Delta R - \Delta Rm \tag{8}$$

$$C1 = R - \Delta R + \Delta Rm \tag{9}$$

$$C2 = R - \Delta R - \Delta Rm \tag{10}$$

In each of the above cases (1), (2), (3), the output voltage $(V_o+)-(V_o-)$ of the full bridge circuit can be determined by:

$$(V_o+)-(V_o-) = (\Delta R/R)(V_{ex}^+ - V_{ex}^-) \tag{11}$$

Where the strain gages are connected as a full bridge as shown in FIG. 2 the combined resistance thereof is expressed by:

$$r = \{(T1+C2)(T2+C1)\}/\{(T1+C2)+(T1+C2)\} \tag{12}$$

Therefore, assuming that $T1 = T2 = C1 = C2 = T$, $$r = \{(2R) \times (2R)\}\{(2R)+(2R)\} = R \tag{13}$$

Therefore, the combined resistance of the full bridge is the same as the resistance of each of the strain gages. As a result, the current flowing through the full bridge is large, resulting in increased electric power consumption. Since the bridge consumes a large amount of electric power, it is practically difficult to construct electronic scales of liquid crystal displays and CMOS-ICs and drive then with dry cells.

In order to prevent a weight value from being varied by a change in the resistance of the strain generator Y, a temperature compensating resistor Rs0 may be connected between an output terminal of the bridge and the operational amplifier. With such an arrangement, however, the resistance of the temperature compensating resistor is governed by the resistance of the bridge circuit, and it is tedious and time-consuming to select the resistance of the temperature compensating resistor.

SUMMARY OF THE INVENTION

It is an object of the present invention to provide a load detector circuit for a load-cell-type electronic weight scale, the load detector circuit having a load cell which consumes a reduced amount of electric power.

Another object of the present invention is to provide a load detector circuit for a load-cell-type electronic weight scale, the load detector circuit having a load cell which consumes a reduced amount of electric power and including a temperature compensating resistor connected in a circuit separate from a load cell circuit.

To achieve the above objects, a load detector circuit for a load-cell-type electronic weight scale includes strain gages attached to respective strain sensing areas of the strain generator of a load cell. Those strain gages which are mounted on expansive sides of the strain generator are connected in series with each other, and those strain gages which are mounted on contractive sides of the strain generator are connected in series with each other, forming first and second series-connected circuits. The first and second series-connected circuits are connected in series with each other as a half bridge which serves as a strain detecting circuit. A load applied to the strain generator is detected by an output signal produced from the junction between the first and second series-connected circuits.

With the above arrangement, the combined total resistance of the half bridge is increased to reduce the amount of electric power consumed by the half bridge.

Moreover, a load detector circuit for a load-cell-type electronic weight scale has a plurality of strain gages attached to a strain generator and connected in series to form a half bridge circuit as a strain detecting circuit, and an output signal from the half bridge circuit is applied to a load detecting circuit to detect a load applied to the strain generator. The load detector circuit also includes a temperature compensating resistor connected in a circuit separate from the strain detecting circuit. A gain control means is provided for controlling a gain in a direction to eliminate a temperature-dependent change in the output signal from the load detecting circuit based on a change in the resistance of the temperature compensating resistor due to a change in the temperature of the strain generator. Since the temperature compensating resistor circuit on the strain generator is separate from the strain gages, a span can be temperature-compensated irrespective of the resistance of the bridge.

The above and other objects, features and advantages of the present invention will become more apparent from the following description when taken in conjunction with the accompanying drawings in which preferred embodiments of the present invention are shown be way of illustrative example.

DETAILED DESCRIPTION OF THE PREFERRED EMBODIMENTS

Figure 3:
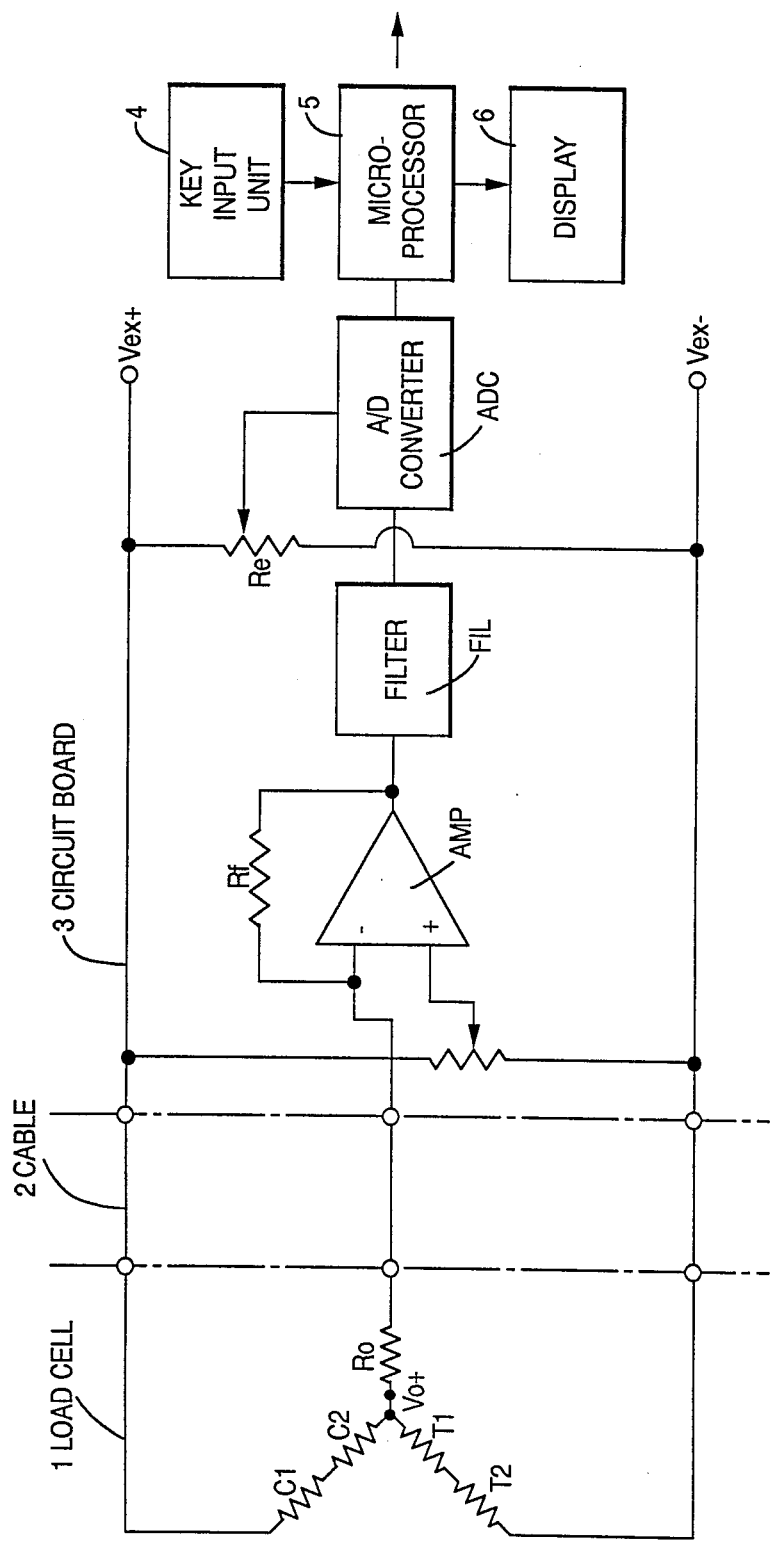
FIG. 3 is a circuit diagram, partly in block form, of a load detecting circuit according to a first embodiment of the present invention.

FIG. 3 shows a load detecting circuit according to a first embodiment of the present invention. The load detecting circuit includes four strain gages T1, T2, C1, C2 attached to a strain generator Y. The strain gages T1, T2 which are mounted on expansive sides, respectively, of strain sensing areas of the strain generator, i.e., in diagonally opposite relation, are connected in series with each other. The strain gages C1, C2 which are mounted on contractive sides, respectively, of the strain sensing area in diagonally opposite relation, are connected in series with each other. The strain gages form T1, T2, C1 and C2 form a half bridge circuit which issues an output signal from the junction between the two series-connected circuits. Assuming that $T1=T2=C1=C2=R$, the total resistance $r'$ of the half bridge circuit is given by:

$$R'=(C1+C2)+(T1+T2)=4R \qquad (14)$$

Since the total resistance of the half bridge circuit is four times greater than the resistance of the conventional full bridge circuit, the half bridge circuit has a greater current limiting ability, thereby lowering the electric power consumption. The output voltage of the half bridge circuit is indicated by:

$$VO^+ = \{(Vex^+ - Vex^-)/2\} + (\Delta R/2R)(Vex^+ - Vex^-) \qquad (15)$$

Figure 1:
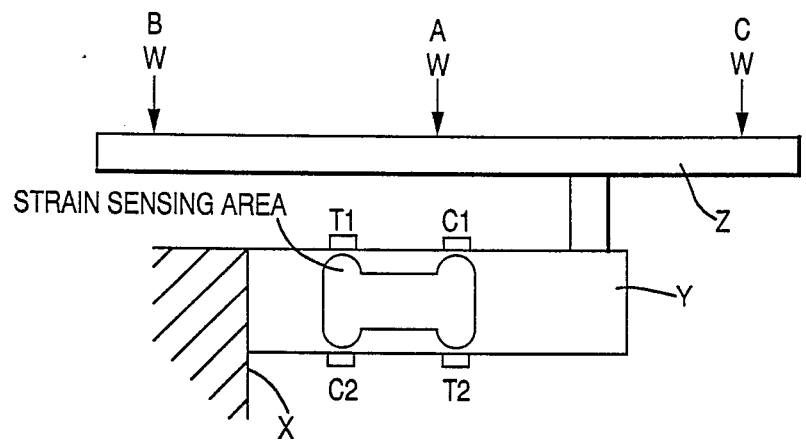
FIG. 1 is an elevational view of a load detector having a strain gages attached to a strain generator.
Figure 2:
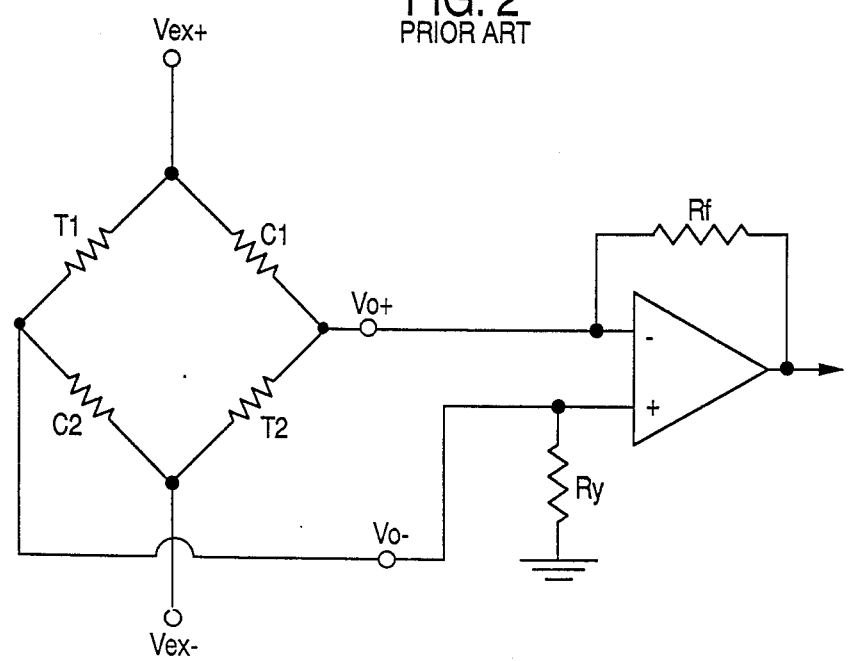
FIG. 2 is a circuit diagram of a conventional load detecting circuit.

Therefore, the output voltage of the half bridge circuit remains constant irrespective of the position A, B, or C (FIG. 1) where the load is applied.

The magnitude of the output signal from the half bridge circuit is ½ of the magnitude of the output signal from the conventional full bridge circuit of strain gages, but the output signal from the half bridge circuit is proportional to the applied load as with the full bridge circuit.

In FIG. 3, the load detecting circuit has a load cell 1 including the half bridge and a compensating resistor R0 coupled to the output terminal of the half bridge for compensating for a temperature-dependent change in the output signal. The load cell 1 is electrically connected to a circuit board 3 by means of cables 2. The compensating resistor R0 serves to vary the amplification factor of an operational amplifier AMP dependent on a temperature-dependent change of the resistance $R_o$ of the strain generator, for temperature compensation of the Youngs's modulus of the strain generator to effect temperature compensation of the output signal, as disclosed in Japanese Laid-Open Patent Publication No. 63-58202. The operational amplifier AMP, a filter FIL, and an A/D converter ADC are mounted on the circuit board 3. The output signal from the half bridge circuit is applied via the compensating resistor R0 to an inverting input terminal of the operational amplifier AMP. The output terminal of the operational amplifier AMP is connected to the filter FIL which removes high-frequency components from the output signal from the operational amplifier AMP. The output signal from the filter FIL is converted by the A/D converter ADC to a digital signal which is applied to a microprocessor 5. The microprocessor 5 processes the signal according to prescribed arithmetic operations to apply data such as a net weight to a display unit 6 and a signal to a label printer (not shown). A signal produced by a key input unit 4 is supplied to the microprocessor 5. A reference voltage produced by a resistor Re is applied to the A/D converter ADC.

In this embodiment, the strain gages are attached to the strain sensing area of the two-beam-type stain generator, and those strain gages which are disposed in diagonally opposite relationship are connected in series with each other to form a half bridge circuit. With such an arrangement, the electric power consumption by the load cell is reduced, and hence there can be realized a load-cell electronic weight scale which employs a liquid crystal display unit and CMOS ICs and which is driven by a dry cell.

Although not shown in the first embodiment, a selector circuit may be connected to a stage preceding the operational amplifier AMP for selecting a signal generated from the junction between first and second strain gages of the half bridge or a reference voltage. When a load applied to the strain generator is to be measured, the selector circuit selects the signal from the junction between the first and second strain gages. Upon calibration, the selector circuit selects the reference voltage. The selector circuit is omitted from illustration for the sake of brevity, but will be described in embodiments which will be described below.

In each of the embodiments which follow, a temperature compensating resistor is disposed in a circuit separate from the load cell circuit.

Figure 4:
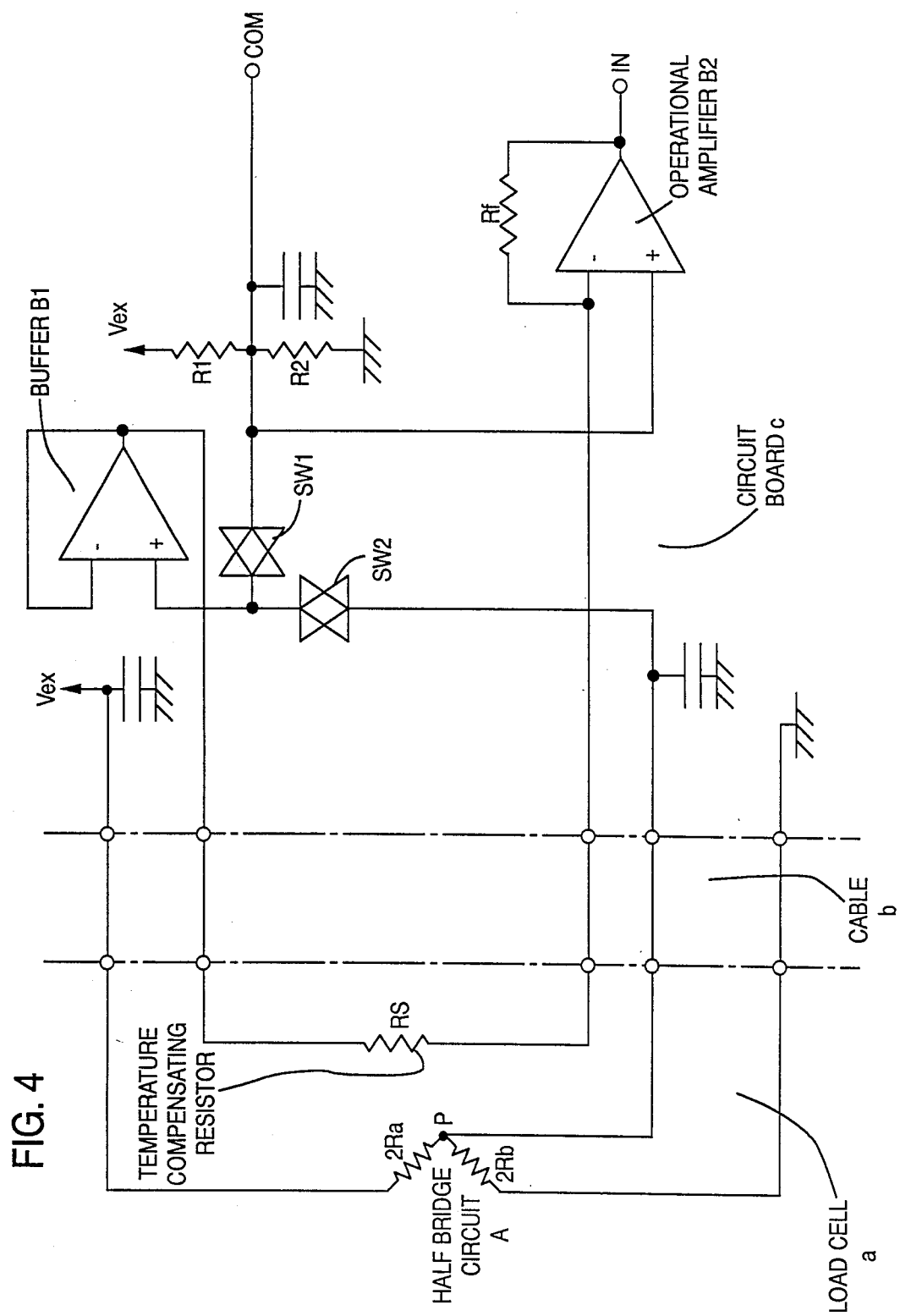
FIG. 4 is a circuit diagram, partly in block form, of a load detecting circuit according to a second embodiment of the present invention.

FIG. 4 shows a load detector circuit of a second embodiment of the present invention. For the sake of brevity, the resistances of the strain gages T1, T2 in FIG. 3 are shown as equal resistances Ra, and the resistances of the strain gages C1, C2 in FIG. 3 are shown as equal resistances Rb, in FIG. 4. A temperature compensating resistor is indicated by Rs.

As illustrated in FIG. 4, the four strain gages 2Ra, 2Rb attached to a strain generator form a half bridge circuit A, and the junction P between the strain gages 2Ra, 2Rb is connected to a reference potential terminal COM via mode selector switches SW1, SW2 which select one of a weighing mode and a drift compensating mode (calibration mode). With this half bridge circuit, if Ra=Rb=R, then the total resistance r is 4R, and hence the half bridge circuit can be driven with lower electric power as compared with the conventional full bridge circuit.

The junction P is coupled to an operational amplifier B2 through the switch SW2, a buffer B1, and the temperature compensating resistor Rs in the load cell a. The buffer B1 serves as a noninverting amplifier with a gain of 1, and the operational amplifier B2 as an inverting amplifier. The output terminal of the operational amplifier B2 is connected through a low-pass filter to an input terminal IN of a subsequent control circuit such as an A/D converter. The mode selector switches SW1, SW2 are in the form of analog switches. The mode selector switches SW1, SW2, resistors R1, a feedback resistor Rf, the buffer B1, and the operational amplifier B2 are mounted on a circuit board c.

The temperature compensating resistor Rs varies the amplification factor of the inverting amplifier composed of the operational amplifier B2 and the resistors Rs, Rf dependent on the temperature of the strain generator, for temperature compensation of the Young's modulus of the strain generator of the strain-gage load cell to effect temperature compensation of the output voltage corresponding to a span.

Figure 5:
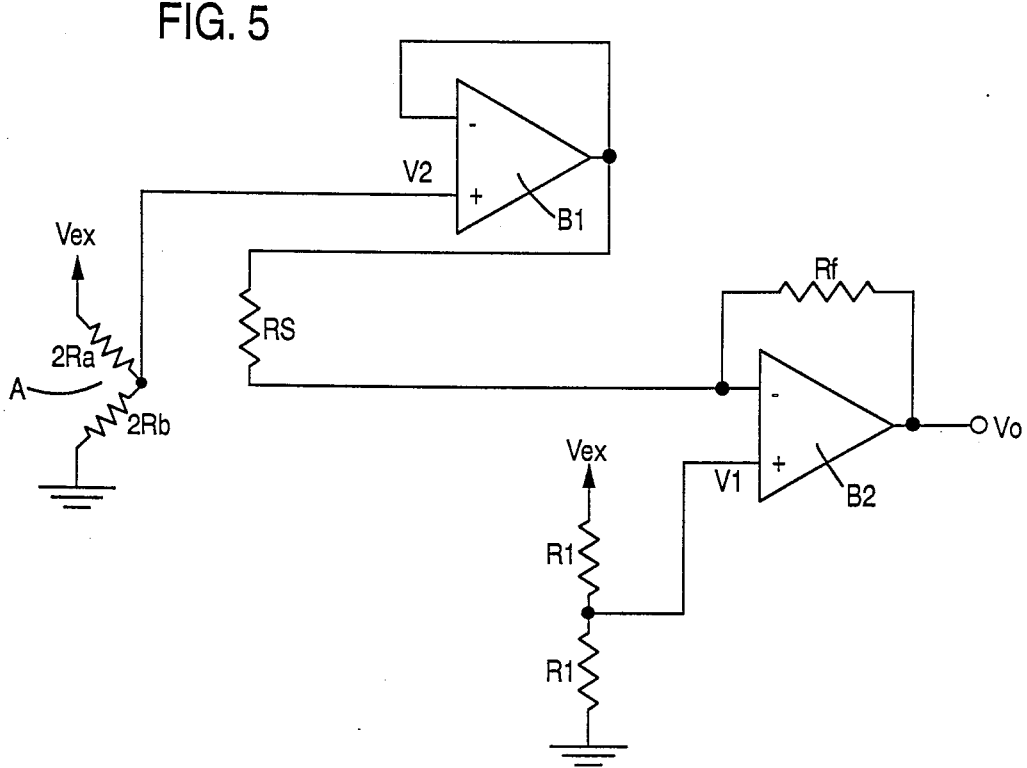
FIGS. 5 and 6 are circuit diagrams explaining operation of the load detecting circuit of the second embodiment.

FIG. 5 is a circuit diagram of the load detector circuit of FIG. 4 when the weighing mode is selected. In the weighing mode, the switch SW1 of FIG. 4 is turned off, whereas the switch SW2 is turned on.

Figure 6:
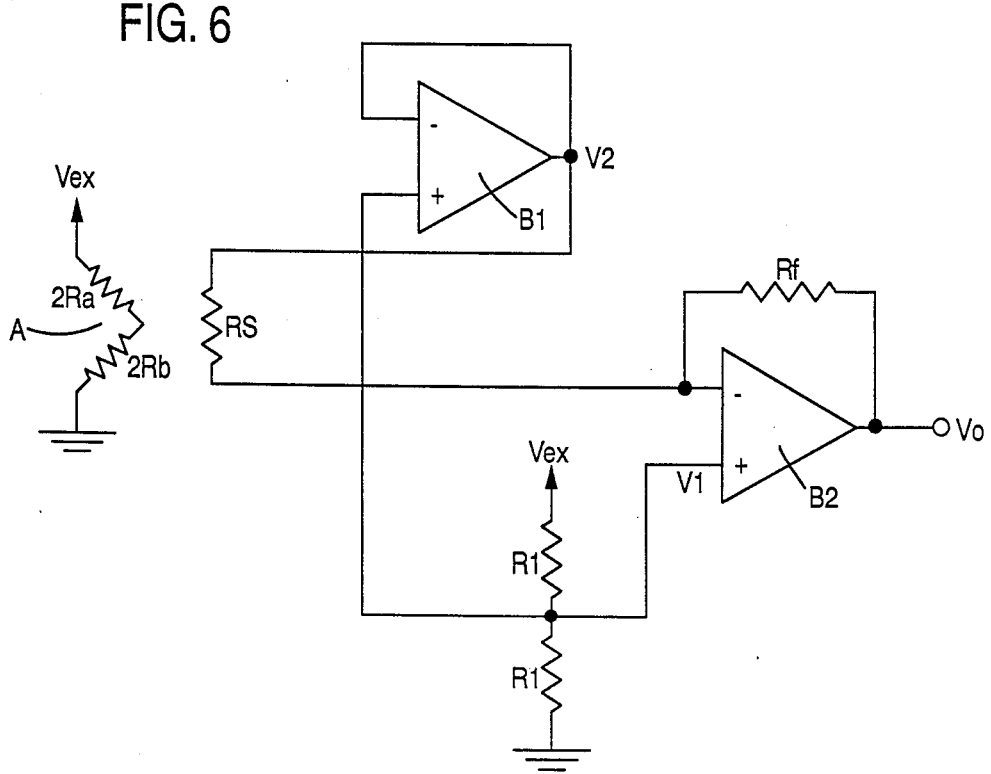

FIG. 6 is a circuit diagram of the load detector circuit of FIG. 4 when the drift compensating mode is selected. The switch SW1 is turned on and the switch SW2 is turned off, and the amount of drift which is developed at this time is stored as a bias value, which is compensated for by a microcomputer through arithmetic operations. According to the present invention, as shown, drift compensation is carried out by a single simple circuit arrangement composed of the two switches.

Since to current flows from the bridges circuit into the temperature compensating resistor Rs as shown in FIG. 4, the span can be temperature-compensated irrespective of the resistance of the bridge. The circuit arrangement is made simple because it is energized by a power supply (of 5 V for example) which is also shared by the load cell for its energization.

Figure 7:
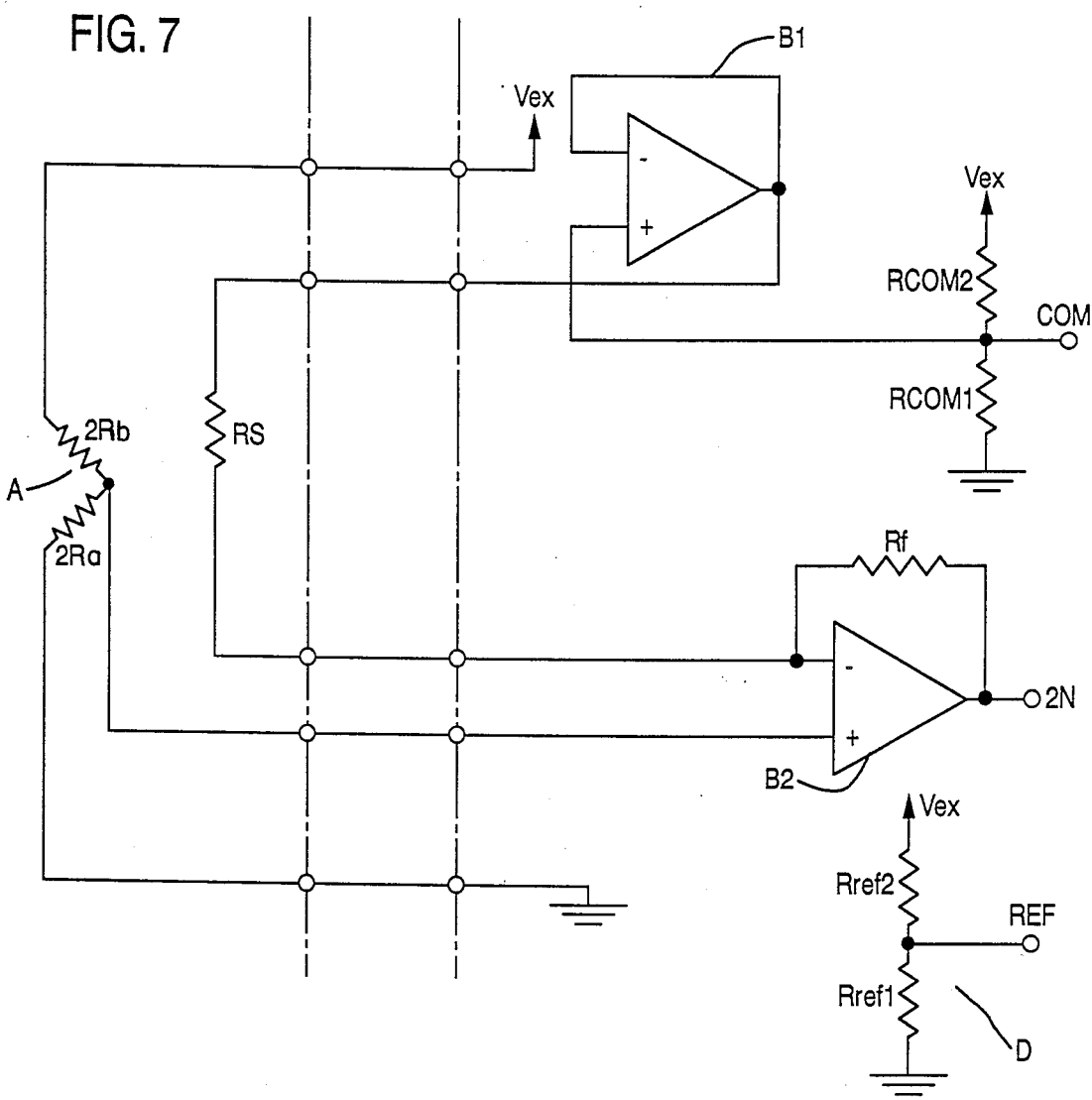
FIG. 7 is a circuit diagram, partly in block form, of a load detecting circuit according to a third embodiment of the present invention.

FIG. 7 is a circuit diagram of a load detector circuit according to a third embodiment of the present invention. An output signal from the half bridge circuit is supplied to the noninverting input terminal of the operational amplifier B2, and the reference potential terminal COM is coupled to the noninverting input terminal of the buffer B1. Operation and advantages of the load detector circuit of the third embodiment are the same as those of the second embodiment.

Figure 8:
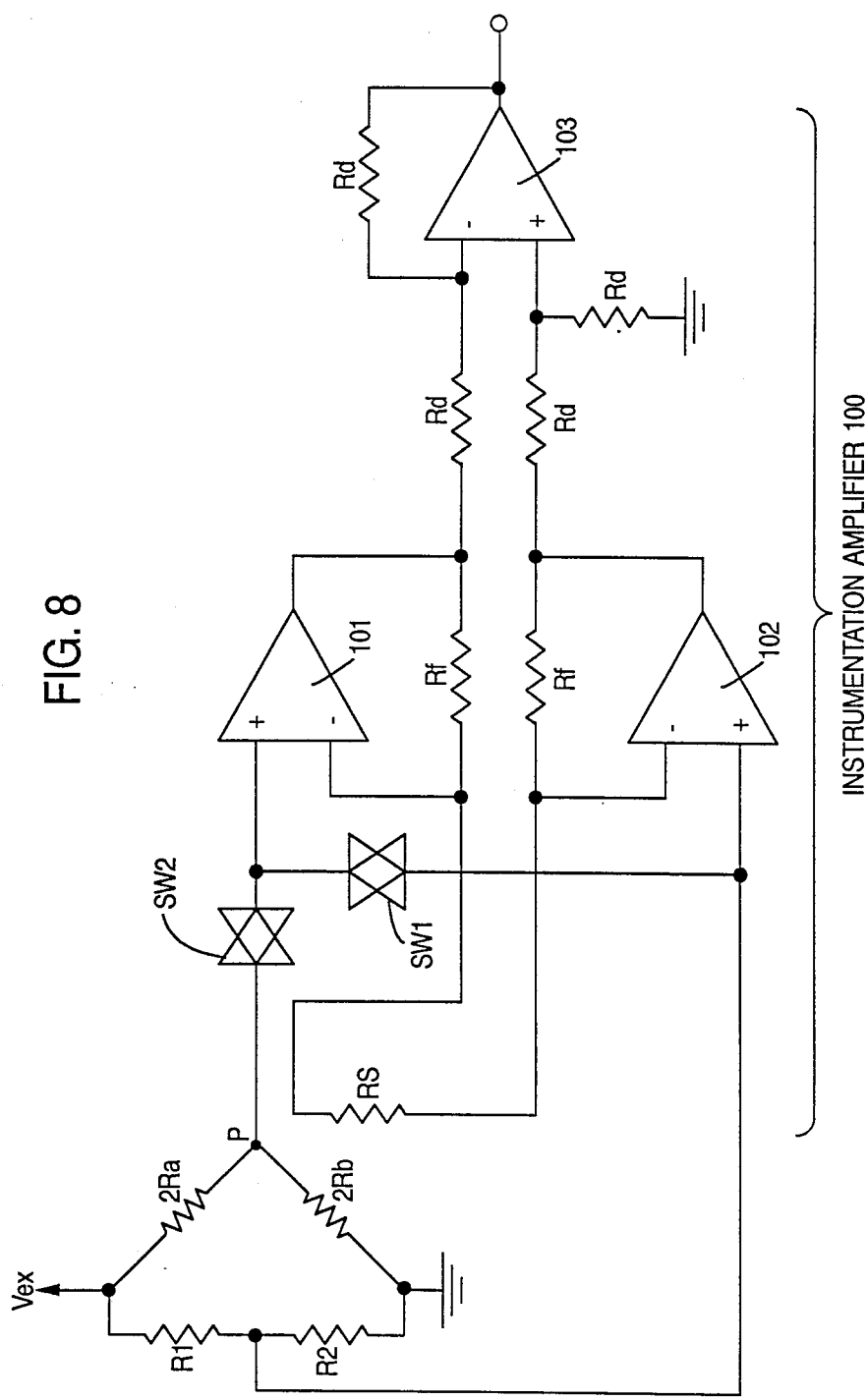
FIG. 8 is a circuit diagram, partly in block form, of a load detecting circuit according to a fourth embodiment of the present invention.

FIG. 8 illustrates a load detector circuit according to a fourth embodiment of the present invention. In FIG. 8, an output signal from the half bridge circuit is applied to an instrumentation amplifier 100, which has two symmetrically arranged operational amplifiers 101, 102 and an operational amplifier 103 for receiving output signals from the operational amplifiers 101, 102. The central point or junction P of the half bridge is connected to positive terminals + of the operational amplifiers 101, 102. Two resistors R1, R2 are connected in parallel to the half bridge. The junction between the resistors R1, R2 is joined to the positive terminal + of the operational amplifier 102. The two resistors R1, R2 are positioned where no strain is developed by the strain generator, or comprise ordinary resistors disposed near the strain generator and having resistances that are several times greater than those of the strain gages. Therefore, the electric power consumption by these two resistors R1, R2 is negligible as compared with that by the strain gages. A temperature compensating resistor Rs is connected between negative terminals − of the operational amplifiers 101, 102, which have output terminals connected respectively to the negative and positive terminals −, + of the operational amplifier 103.

In the fourth embodiment, when the weighing mode is selected, the switch SW1 is turned off and the switch SW2 is turned on, and when the drift compensating mode is selected, the switch SW1 is turned on and the switch SW2 is turned off.

The temperature compensating resistor Rs varies the amplification factor of the instrumentation amplifier 100 for temperature compensation of the Young's modulus of the strain generator of the strain-gage load cell to carry out temperature compensation of the output voltage corresponding to a span.

With the present invention, as describe above, since the load is detected by the half bridge circuit composed of the plural strain gages attached to the strain generator, the electric power consumption by the bridge circuit is reduced. Since no current directly flows from the bridge circuit into the temperature compensating resistor, the span can be temperature-compensated irrespective of the resistance of the bridge. The weighing mode and the drift compensating mode can easily be selected by adding the switches.

Although certain preferred embodiments have been shown and described, it should be understood that many changes and modifications may be made therein without departing from the scope of the appended claims.

What is claimed is:

1. A load detector circuit for load-cell electronic weighing scale, comprising:

a strain generator having a first and second strain sensing areas for developing a strain in response to a load applied thereto;

first and second strain gages mounted on said first strain sensing area and having a resistance which is variable in a positive direction when the strain is developed on said strain generator, said first and second strain gages connected in series with each other;

third and fourth strain gages mounted on said second strain sensing area and having a resistance which is variable in a negative direction when the strain is developed on said strain generator, said third and fourth strain gages connected in series with each other, said first and second strain gages and said third and fourth strain gages connected at a junction and forming a strain detecting circuit;

a load detecting circuit, operatively connected to said strain detecting circuit, for detecting the load applied to said strain generator in response to a signal from the junction between said first and second strain gages and said third and fourth gages of said strain detecting circuit.

2. A load detector circuit according to claim 1, further comprising a selector circuit connected to a stage preceding said load detecting circuit for selecting the signal generated from the junction between said first and second strain gages and said third and fourth strain gages, when measuring the load applied to said strain generator, and for selecting a reference voltage upon calibration.

3. A load detector circuit for load-cell electronic weighing scale, comprising:

a strain generator having first and second strain sensing areas for developing a strain in response to a load applied thereto;

first and second strain gages mounted on said first strain sensing area and having a resistance which is variable in a positive direction when the strain is developed on said strain generator, said first and second strain gages connected in series with each other;

third and fourth strain gages mounted on said second strain sensing area and having a resistance which is variable in a negative direction when the strain is developed on said stain generator, said third and fourth strain gages connected in series with each other, said first and second strain gages and said third and fourth strain gages connected at a junction and forming a strain detecting circuit;

a load detecting circuit for detecting the load applied to said strain generator in response to a signal output from the junction between said first and second strain gages and said third and fourth strain gages of said strain detecting circuit;

a temperature compensating resistor disposed near said strain gages and connected in a circuit separate from said strain detecting circuit; and gain control means, connected to said temperature compensating resistor, for controlling a gain in direction to eliminate a temperature-dependent change in an output signal from said load detecting circuit based on a change in the resistance of said temperature compensating resistor dependent on a change in the temperature of said strain generator.

4. A load detector circuit according to claim 3, further comprising buffer means for receiving the signal output from the junction between said first and second strain gages and said second and third strain gages, said temperature compensating resistor having a first end connected to an output terminal of said buffer means and a second end connected to an input terminal of said load detecting circuit.

5. A load detector circuit according to claim 4, further comprising a selector circuit connected to a stage preceding said load detecting circuit for selecting the signal generated from the junction between said first and second strain gages and said third and fourth strain gages, when measuring the load applied to said strain generator, and for selecting a reference voltage upon calibration.

6. A load detector circuit according to claim 3, further comprising a selector circuit connected to a stage preceding said load detecting circuit for selecting the signal generated from the junction between said first and second strain gages and said third and fourth strain gages, when measuring the load applied to said strain generator, and for selecting a reference voltage upon calibration.

* * * * *